F. POOLE.
WATER HEATER.
APPLICATION FILED FEB. 2, 1915.

1,228,243.

Patented May 29, 1917.

Witnesses

Inventor
Fred Poole,
By Richard B. Owen,
Attorney

UNITED STATES PATENT OFFICE.

FREDERICK POOLE, OF JEWELL, KANSAS.

WATER-HEATER.

1,228,243.  Specification of Letters Patent.  Patented May 29, 1917.

Application filed February 2, 1915. Serial No. 5,738.

*To all whom it may concern:*

Be it known that I, FREDERICK POOLE, a citizen of the United States, residing at Jewell, in the county of Jewell and State of Kansas, have invented certain new and useful Improvements in Water-Heaters, of which the following is a specification.

This invention relates to water heaters, and more particularly to that class of water heaters commonly termed "instantaneous", and has for its primary object the provision of a simple, strong, cheap, and effective water heater which is capable of disposition within a pipe line between the source of supply and the outlet whereby to heat the water or the like flowing therethrough.

My invention consists broadly of a casing, the said casing being interposed in a pipe line and an electric heating element is carried within the casing and spaced from the walls thereof, the water or the like flowing through the casing around the heating element thereby instantaneously heating the water.

Another object of my invention resides in the provision of suitable means for supporting the heating element within the casing mentioned.

A still further object of my invention resides in the peculiar manner in which the heating element is disposed in the pipe line, a plurality of branches being associated with a main source of supply, and a heating element being associated with one of the branches.

With the above and other objects in view, my invention resides preferably in the construction, combination, and arrangement of parts as hereinafter set forth in the specification and illustrated in the accompanying drawings, in which—

Similar reference characters indicate similar parts throughout the various views of the drawings.

Figure 1:
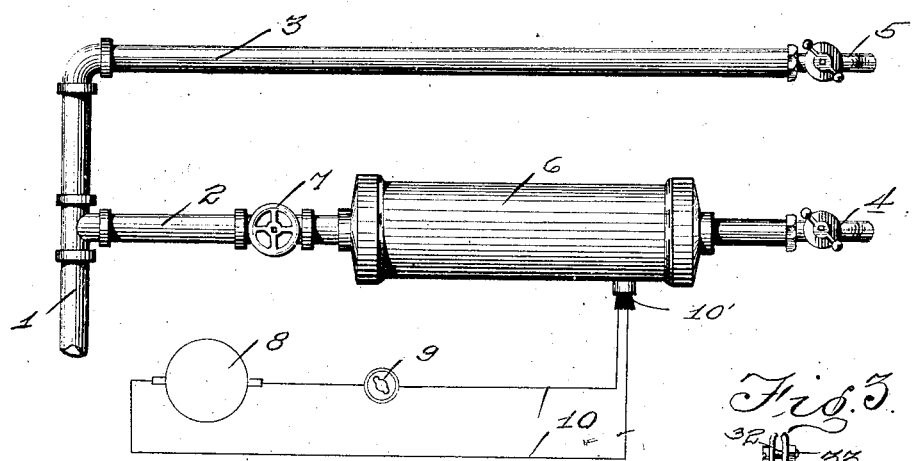
Figure 1 is a top plan view of a main source of supply and two branches illustrating one application of my invention.
Figure 3:
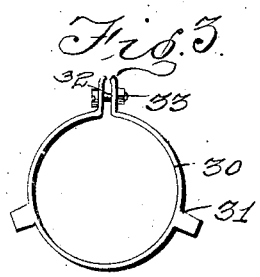
Fig. 3 is a detail view of a spacing element which I utilize in the preferred embodiment of my invention.
Figure 2:
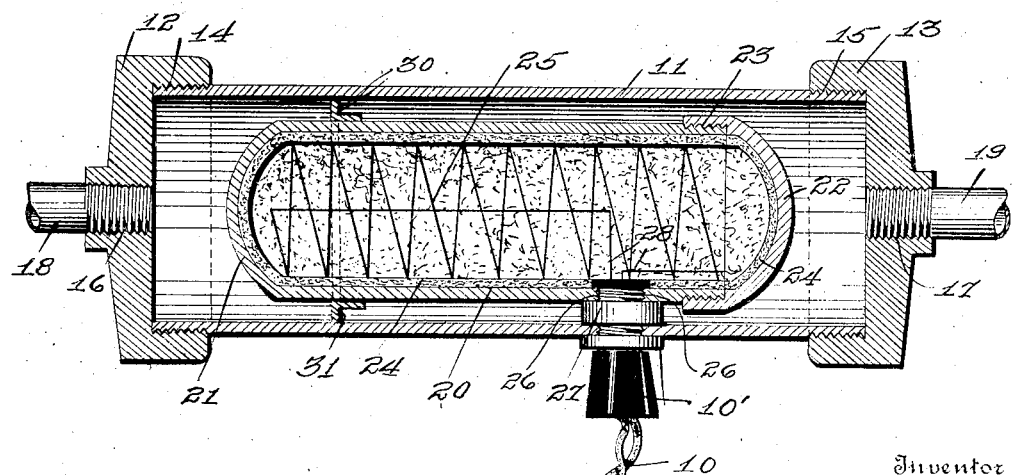
Fig. 2 is a longitudinal sectional view of one form of my invention.

Referring more particularly to the drawings, in Fig. 1 I have illustrated one of the many applications of my invention, and in this instance the form illustrated in Fig. 2 has been shown in elevation. It will be noted that I have illustrated a source of liquid supply 1 having two branches or tributaries 2 and 3, the said tributaries 2 and 3 terminating in outlet faucets 4 and 5 respectively, of any approved design. The water heater is indicated generally by the numeral 6, and it will be noted that the water heater 6 is interposed in the branch 2 between the source of supply 1 and the outlet faucet 4. An auxiliary valve 7 is provided to shut off the liquid supply in the branch 2 when it is desired to repair or clean the water heater 6. A suitable source of electric current supply is indicated by the numeral 8 controllable by the switch 9, electric conductors 10 serving to supply electric current to the heater. An electric connecting plug of any suitable design may be employed for the purpose of affording detachable electrical communication with the resistance coil 25, but I prefer to use a form which I have illustrated, and indicated generally in the accompanying drawings by the numeral 10'.

From the above description, it will be seen that the water heater is so disposed within one of the branches provided so that liquid flowing therethrough will be instantly heated, and it will be noted that the source of supply 1 may reside in only one water or liquid conduit until the point at which the hot water may be desired is reached, at which point a branch or branches may be provided in the conduit 1 and my improved heater applied thereto.

I have illustrated a present form of my improved heater in Fig. 2, and in this view, it will be noted that I provide a casing 11 having end caps 12 and 13, which are in threaded engagement with the casing 11 as indicated at 14 and 15, respectively, the said screw caps 12 and 13 being provided with central alining threaded openings 16 and 17, respectively, into which may be threaded the ends of water conduits 18 and 19, respectively, the said water conduits 18 and 19 corresponding substantially to the tributary 2 shown in Fig. 1.

The heating element itself comprises preferably a casing 20, the said casing 20 being permanently closed at one end as indicated at 21, and at the other end by means of a screw cap 22 which is in threaded engagement with the casing 20 as indicated at 23. The casing 20 and cap 22 are preferably lined with some insulating material indicated at 24, and a coiled resistance element or the like 25 is receivable within the casing 20, the insulating material 24 being interposed between the resistance element 25 and the walls of the casing 20 so as to insulate the same therefrom for an obvious reason. I have diagrammatically indicated the heating element and it will be understood that any of the many advantageous forms of heating elements may be utilized when desired, and that I do not desire to be limited to any particular form of heating element.

The casing 20 is spaced from the inner surface of the casing 11 by means of a spacing band 30, the said spacing band having a plurality of radially extending projections 31 thereon, being divided as shown at 32 and having a clamping screw 33 passing therethrough in order to retain the same in engagement with the casing 20, the said radial extensions 31 engaging the inner surface of the casing 11 and spacing the said heating element therefrom.

I desire to lay stress upon one of the very advantageous features of my invention which is that the same may be interposed in a tributary of a main source of supply, a second tributary being disposed adjacent the same, so that hot and cold water may be readily had without the use of complicated heating devices. It is preferable to construct the casing 20 of some non-corrosive material and care should also be taken that the material used is one which has a high heat conductive coefficient, so that the transmission of heat from the heating coil contained therein will be practically instantaneous.

A threaded bushing 26 is provided supporting the casing 20 in spaced relation to the casing 11, and a washer 27 arranged upon the bushing assists in this function, the electric conductors 28 passing through the bushing 26.

The applications of my invention which I have illustrated in the drawings are only a few of its many applications, and while I have shown and described the same as possessing a peculiar form and construction, it is desired that I may make such changes in the detail structure thereof as do not depart from the spirit and scope of the invention as claimed.

What is claimed is:

1. A water heater including a casing interposed in a pipe line, a second casing within said first casing having a removable closure cap, an insulating lining for the second casing and the closure cap, an electrical heating element in said second casing, a connecting plug carried by the main casing and connected to said heating element, and a spacing band arranged about the second casing for maintaining the same in spaced relation from the first casing.

2. A water heater, including a main casing interposed in a pipe line, a second casing within said main casing having a removable closure cap, an insulating lining for the second casing and the closure cap, an electrical heating element in said second casing, a connecting plug carried by the main casing and connected to said heating element, a spacing element formed of heat non-conducting material arranged adjacent the connecting plug, and a band arranged about the second casing for maintaining the same in spaced relation from said first casing.

In testimony whereof I affix my signature in presence of two witnesses.

FRED. POOLE.

Witnesses:
 FRED V. KREAMER,
 A. C. ELY.